United States Patent
Peltier et al.

(10) Patent No.: US 10,135,157 B2
(45) Date of Patent: Nov. 20, 2018

(54) BINDING SCREW FOR A WIRE CONNECTION ASSEMBLY AND WIRE CONNECTION ASSEMBLY

(71) Applicant: Tyco Electronics Simel SAS, Gevrey-Chambertin (FR)

(72) Inventors: Bruno Peltier, Apollinaire (FR); Christopher Monamy, Beaune (FR)

(73) Assignee: Tyco Electronics Simel SAS, Gevrey-Chambertin (FR)

( * ) Notice: Subject to any disclaimer, the term of this patent is extended or adjusted under 35 U.S.C. 154(b) by 0 days.

(21) Appl. No.: 15/460,802

(22) Filed: Mar. 16, 2017

(65) Prior Publication Data
US 2017/0187128 A1 Jun. 29, 2017

Related U.S. Application Data

(63) Continuation of application No. PCT/EP2015/067179, filed on Jul. 27, 2015.

(30) Foreign Application Priority Data

Sep. 22, 2014 (EP) .................................. 14306459

(51) Int. Cl.
| | | |
|---|---|---|
| *H01R 4/62* | (2006.01) | |
| *H01R 4/36* | (2006.01) | |
| *F16B 31/02* | (2006.01) | |
| *F16B 35/00* | (2006.01) | |

(52) U.S. Cl.
CPC ............. *H01R 4/36* (2013.01); *F16B 31/021* (2013.01); *F16B 35/005* (2013.01); *H01R 4/62* (2013.01)

(58) Field of Classification Search
CPC .... H01R 2103/00; H01R 4/36; H01R 13/622; H01R 13/639; H01R 2201/26; H01R 4/64; H01R 13/447; H01R 13/502; H01R 13/512; H01R 13/533; H01R 13/60; H01R 13/6581; H01R 13/6592; H01R 24/38
See application file for complete search history.

(56) References Cited

U.S. PATENT DOCUMENTS 3,602,872 A * 8/1971 Braunstein ........... H01R 4/2404
174/71 C
3,848,955 A * 11/1974 Lockie ................. H01R 4/2483
174/71 C
(Continued)

FOREIGN PATENT DOCUMENTS

DE 10309004 A1 9/2004
EP 0250907 A2 3/1987
(Continued)

OTHER PUBLICATIONS

PCT Search Report and Written Opinion, dated Oct. 19, 2015, 9 pages.
Abstract of DE10309004, dated Sep. 16, 2004, 2 pages.

*Primary Examiner* — Truc Nguyen
(74) *Attorney, Agent, or Firm* — Barley Snyder

(57) ABSTRACT

A binding screw for a wire connection assembly comprises a driving section, a threaded section, and a contact section. The contact section has a tapered penetration portion establishing electrical contact with a stranded wire. A length of the penetration portion is at least three-quarters of a diameter of the binding screw in the threaded section.

13 Claims, 2 Drawing Sheets

(56) References Cited

U.S. PATENT DOCUMENTS

| | | | | |
|---|---|---|---|---|
| 4,738,009 | A * | 4/1988 | Down | H01R 9/0509 |
| | | | | 29/33 M |
| 4,878,855 | A * | 11/1989 | Heng | H01R 4/2404 |
| | | | | 439/275 |
| 6,338,658 | B1 * | 1/2002 | Sweeney | H01R 4/36 |
| | | | | 439/709 |
| 7,122,741 | B2 * | 10/2006 | Gossman | H01R 4/2483 |
| | | | | 174/87 |
| 8,267,730 | B2 | 9/2012 | Stauch et al. | |
| 2003/0207610 | A1 * | 11/2003 | Lindemann | H01R 4/5033 |
| | | | | 439/427 |
| 2005/0153597 | A1 * | 7/2005 | Schaty | H01R 4/307 |
| | | | | 439/521 |
| 2006/0292936 | A1 * | 12/2006 | Fankhauser | H01R 4/5016 |
| | | | | 439/805 |
| 2007/0059992 | A1 * | 3/2007 | Kim | H01H 50/443 |
| | | | | 439/810 |
| 2010/0159737 | A1 * | 6/2010 | Elsaesser | H01R 4/2483 |
| | | | | 439/416 |
| 2014/0194015 | A1 * | 7/2014 | Schmidt | H01H 1/5866 |
| | | | | 439/877 |
| 2014/0322994 | A1 * | 10/2014 | Keeven | H01R 13/03 |
| | | | | 439/886 |

FOREIGN PATENT DOCUMENTS

| | | |
|---|---|---|
| EP | 2999054 B1 | 7/2017 |
| GB | 2367957 A | 7/2000 |

\* cited by examiner

BINDING SCREW FOR A WIRE CONNECTION ASSEMBLY AND WIRE CONNECTION ASSEMBLY

CROSS-REFERENCE TO RELATED APPLICATIONS

This application is a continuation of PCT International Application No. PCT/EP2015/067179, filed on Jul. 27, 2015, which claims priority under 35 U.S.C. § 119 to European Patent Application No. 14306459.0, filed on Sep. 22, 2014.

FIELD OF THE INVENTION

The present invention relates to a binding screw, and more particularly, to a binding screw for a wire connection assembly.

BACKGROUND

Binding screws and wire connection assemblies comprising binding screws are known in the art and are used for splicing or connecting stranded wires in power distribution networks or long distance transmission systems distributing electrical power. Known wire connection assemblies generally comprise a connector body having at least one receiving chamber into which a wire or a stranded end section thereof is inserted. The binding screw is then inserted into a bore which provides access to the receiving chamber from outside of the connector body and extends essentially perpendicularly to the wire. When the screw is then turned so that it enters the receiving chamber through the bore, the wire is compressed between the screw and the walls of the receiving chamber and an electrical contact is established between the screw, the inner walls of the receiving chamber, and the wire. Further, the wire is fixed in the wire receiving chamber so that a solid electrical connection is established.

Due to weight and cost reduction requirements, stranded aluminum wires are increasingly used instead of the previously used copper wires. Stranded aluminum wires, however, are more prone to damage than copper wires when clamped by the binding screws. The aluminum wires or strands may break and rip apart due to the turning movement of the screw. Further, aluminum is covered by an aluminum oxide layer when exposed to air. The oxide layer has to be penetrated at least by the screw in order to establish a proper electrical contact between the screw and the wire.

SUMMARY

An object of the invention, among others, is to provide a binding screw for a wire connection assembly which forms a good electrical connection while decreasing the risk of damaging a stranded wire. The disclosed binding screw comprises a driving section, a threaded section, and a contact section. The contact section has a tapered penetration portion establishing electrical contact with a stranded wire. A length of the penetration portion is at least three-quarters of a diameter of the binding screw in the threaded section.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
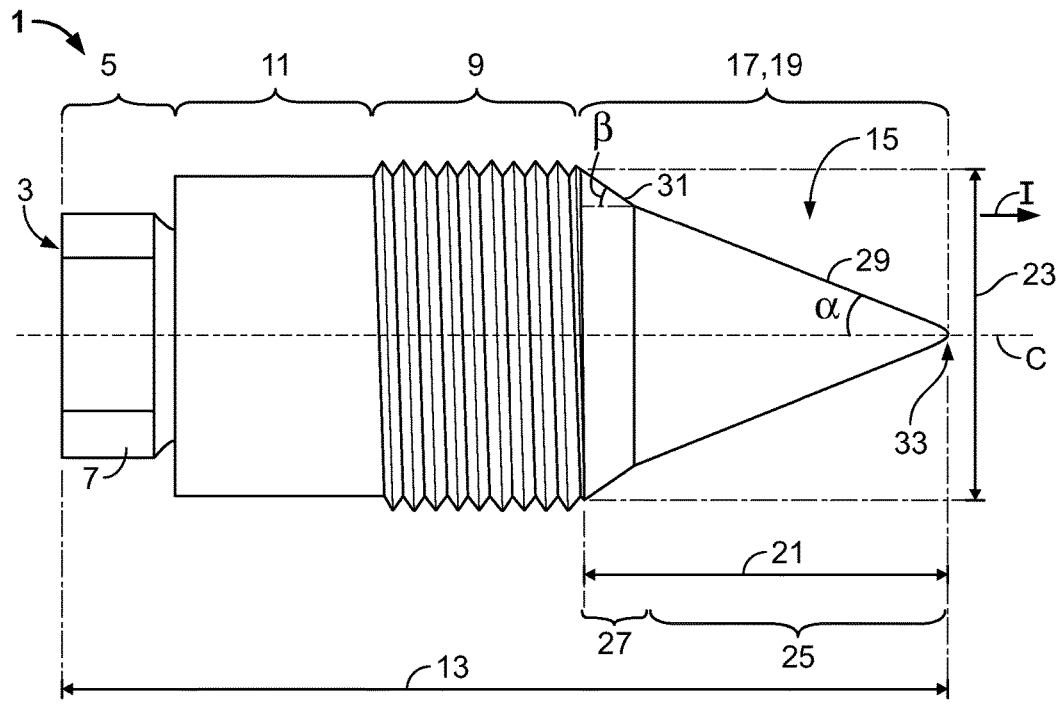
FIG. 1 is a side view of a binding screw according to the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A binding screw 1 according to an embodiment of the invention is shown generally in FIG. 1. The binding screw 1 extends longitudinally along a central axis C. The binding screw 1 is insertable in an insertion direction I which runs parallel with the central axis C. Along the central axis C, the binding screw 1 is subdivided into several sections which will be described hereafter.

At a rear end 3, which faces away from the insertion direction I, the binding screw 1 comprises a driving section 5. The driving section 5 has a driving element 7, shaped as a screw nut as shown in the embodiment shown FIG. 1. In other embodiments, the driving element 7 may be any other element used to drive a screw known to those with ordinary skill in the art, for example, a hexagonal recess receiving a complementary shaped driving tool.

The binding screw 1 also has a threaded section 9. The threaded section 9 can be directly adjacent to the driving section 5, or in the embodiment shown in FIG. 1, the threaded section 9 is spaced apart from the driving section 5 along the central axis C by a body section 11. The body section 11 is used to adjust a total length 13 of the binding screw 1. The threaded section 9 is used to move the binding screw 1 into a wire receiving chamber of a connector body upon applying a force on the driving section 5.

At a front end 15 opposite the rear end 3, the binding screw 1 has a contact section 17. The contact section 17 forms an electrical connection with a wire material when the binding screw 1 is inserted into a wire receiving chamber of a wire connection assembly. The contact section 17 has a tapered penetration portion 19. In the embodiment shown in FIG. 1, the penetration portion 19 extends along the whole contact section 17. Alternatively, the contact section 17 may have a non-tapered section between the penetration portion 19 and the threaded section 9. A length 21 of the penetration portion 19 is at least three-quarters of a diameter 23 of the binding screw 1 in the threaded section 9. In other embodiments, the length 21 is equal to or larger than the diameter 23. With such proportions, the penetration portion 19 forms a sharp pointed front end 15.

The penetration portion 19, in the embodiment shown in FIG. 1, is divided into a first conical section 25 and a second conical section 27. The first conical section 25 extends in the insertion direction I. The second conical section 27 is disposed between the first conical section 25 and the threaded section 9. An angle α between a surface 29 of the first conical section 25 and the central axis C is smaller than an angle β between a surface 31 of the second conical section 27 and the central axis C. The angle α in the first conical section 25 is smaller than 30°, and in the shown embodiment, is about 22°.

If the whole penetration portion 19 had a continuous surface 29 with a fixed angle α, the threaded section 9 would have to be placed further away from a tip 33 of the penetration portion 19. Therefore, the second conical section 27 allows the arrangement of the threaded portion 9 closer to the tip 33 of the tapered penetration portion 19. This helps to allow a pre-installation of binding screws 1 in a connector body without blocking the insertion of a cable or stranded wire into the connector body.

The penetration portion 19 is not limited to the embodiment shown and described with reference to FIG. 1 having one or two conical sections 25, 27. In an alternative embodiment, the penetration portion 19 may have a curved shaped with a corresponding curved surface. The curvature can vary along the central axis C. For example, in a vicinity of the tip 33, the curve can have a smaller angle to the central axis than in a vicinity of the threaded section 9. Therefore, the same function as with two conical sections as described above can be achieved with a curved penetration portion 19.

Figure 2:
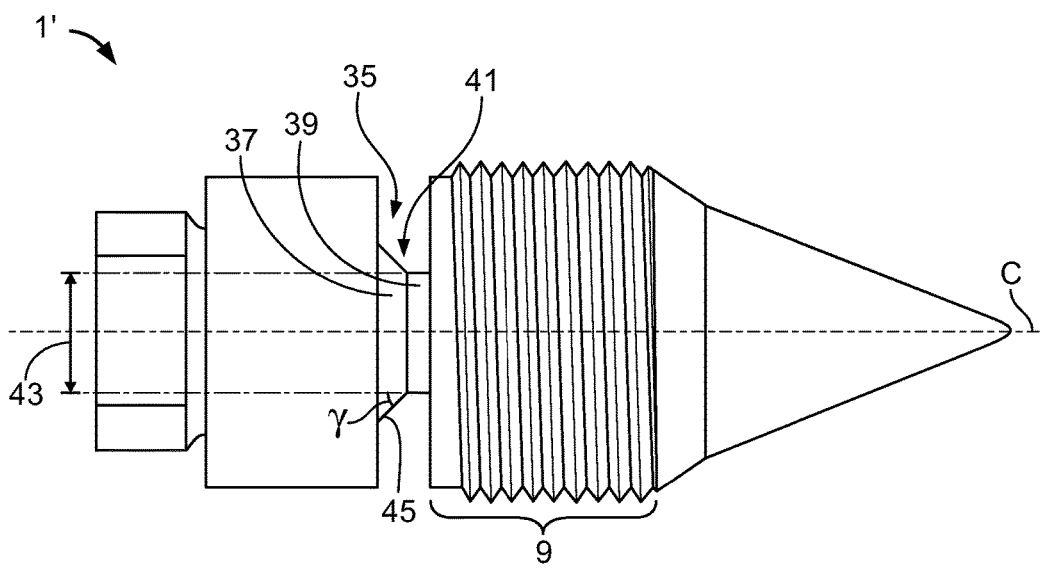
FIG. 2 is a side view of another binding screw according to the invention.

A binding screw 1' according to another embodiment of the invention is shown in FIG. 2. In the following, only the differences with respect to the embodiment of FIG. 1 are described in detail.

The binding screw 1' is a shear bolt having a shear element 35 between the driving section 5 and the threaded section 9. The shear element 35 has a third conical section 37 and a cylindrical section 39. A smaller diameter end 41 of the third conical section 37 faces the threaded section 9. The smaller diameter end 41 of the third conical section 37 is connected to the cylindrical section 39, and both have a cylindrical diameter 43. The cylindrical diameter 43 is used to adjust a force necessary to break the binding screw 1 apart at the shear element 35; a smaller cylindrical diameter 43 leads to shearing of the shearing element 35 at a smaller force compared to a binding screw 1 with a larger diameter 43. The conical shape of the third conical section 37 causes the shear element 35 to break in the cylindrical section 39. The angle between a surface 45 of the third conical section 37 and the central axis C is approximately 45°.

Figure 3:
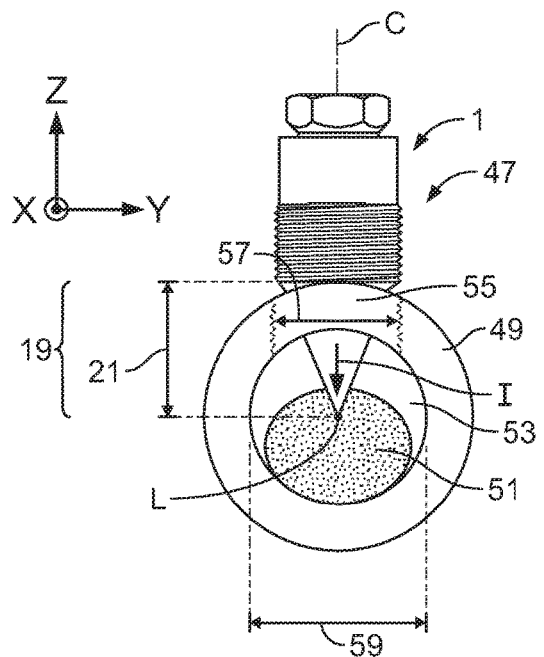
FIG. 3 is a sectional view of a wire connector assembly according to the invention in a pre-insertion position.
Figure 4:
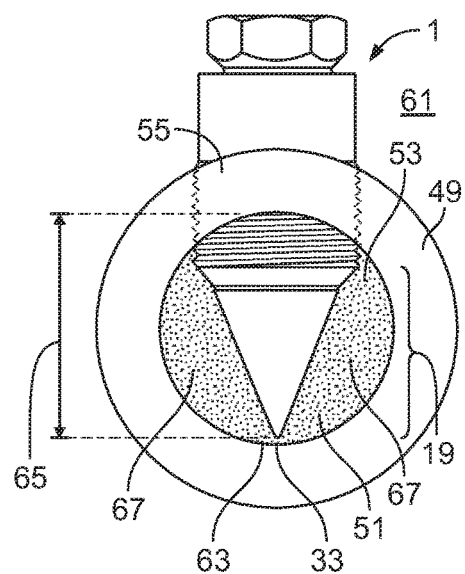
FIG. 4 is a sectional view of the wire connector assembly of FIG. 3 in an inserted position.

A wire connection assembly 47 according to the invention is shown in FIGS. 3 and 4. The wire connection assembly 47 has the binding screw 1 and a connector body 49. FIG. 3 shows the wire connection assembly 47 with the binding screw 1 in a pre-insertion position and also with a cable formed by a stranded wire 51 inserted in a wire receiving chamber 53 of the connector body 49. For the sake of clarity, a coordinate system is shown in FIG. 3; the central axis C of the binding screw 1 and the insertion direction I are parallel to the Z axis of the coordinate system. The wire receiving chamber 53 extends at least partially along a longitudinal axis L which runs parallel with the X axis of the coordinate system and therefore perpendicular to the central axis C. The longitudinal axis L defines an insertion direction for the stranded wire 51. In the shown embodiment, the stranded wire 51 is a stranded aluminum wire.

The connector body 49, as shown in FIG. 3, has a bore 55 which is internally threaded such that the threaded section 9 of the binding screw 1 can be screwed into the bore 55. The bore 55 is centered around the central axis C. A bore diameter 57 is smaller than an inner diameter 59 of the wire receiving chamber 53.

By screwing the binding screw 1 into the bore 55, the contact section 17 enters the wire receiving chamber 53. The length 21 of the penetration portion 19 of the binding screw 1 is at least two-thirds of the inner diameter 59 of the wire receiving chamber 53, and in some embodiments, is at least three-quarters of the inner diameter 59.

FIG. 4 shows the wire connection assembly 47 with the binding screw 1 in an inserted position 61. In order to reach the inserted position 61, the binding screw 1 is screwed into the bore 55 in the connector body 49 by rotating the driving section 5 so that the threaded section 9 interacts with the bore 55 and moves the binding screw 1 in the insertion direction I. In the inserted position 61, the binding screw 1 extends over at least three-quarters of the inner diameter 59 of the wire receiving chamber 53, and in other embodiments, the binding screw 1 extends over at least 90% of the inner diameter 59 into the wire receiving chamber 53. In the shown embodiment, the tip 33 of the penetration portion 19 contacts the inner wall 63 of the wire receiving chamber 53 opposite to the bore 55 or is positioned close to the inner wall 63. A penetration depth 65 of the binding screw 1 in the wire receiving chamber 53 in FIG. 4 thus approaches the inner diameter 59 of the wire receiving chamber 53.

In the inserted position 61, the single strands of the stranded wire 51 are mostly displaced by the penetration portion 19 and are arranged into displacement areas 67 which are physically bordered by the penetration portion 19 and the inner wall 63 of the wire receiving chamber 53. An electrical connection is thus formed between the penetration portion 19, the stranded wire 51, and the inner wall 63.

Figure 5:
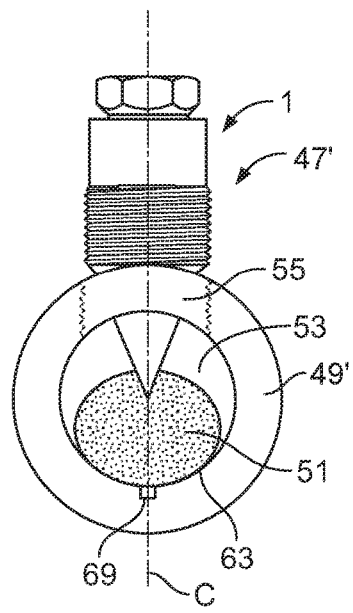
FIG. 5 is a sectional view of another wire connector assembly according to the invention in a pre-insertion position.
Figure 6:
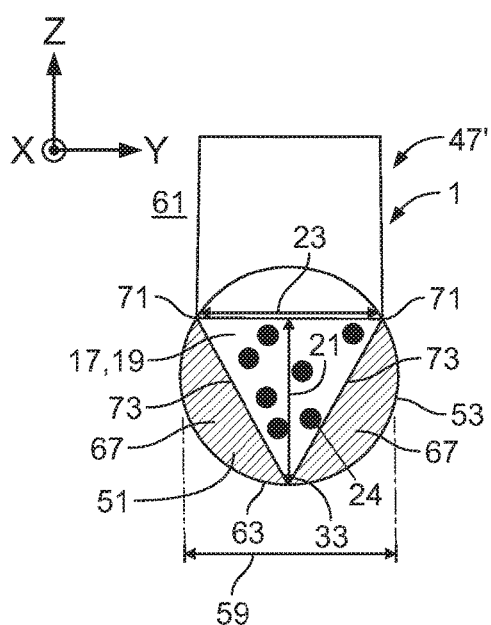
FIG. 6 is a sectional view of the wire connector assembly of FIG. 5 in an inserted position.

A wire connection assembly 47' according to another embodiment of the invention is shown in FIGS. 5 and 6. The wire connection assembly 47' has a connector body 49' according to another embodiment of the invention. Only the differences with respect to the embodiment shown in FIGS. 3 and 4 will be described in greater detail.

The connector body 49' shown in FIGS. 5 and 6 has an extension opening 69 in the inner wall 63 of the wire receiving chamber 53. The extension opening 69 is disposed opposite to the bore 55. Both the bore 55 and the extension opening 69 are centered around the central axis C. The extension opening 69 in the shown embodiment is formed as a blind hole.

The extension opening 69 allows the usage of the same connector body 49' and binding screw 1 for different sizes of a stranded wire 51. In FIGS. 3 and 4, a stranded wire 51 is shown that fills the displacement areas 67 when the binding screw 1 approaches the inner wall 63 with the tip 33. If, for example, a stranded wire 51 with a smaller cross section is used, the displacement areas 67 will not be fully filled with wire strands when the binding screw 1 is in an insertion position 61 as shown in FIG. 4. When the displacement area 67 is not fully filled with strands, the stranded wire 51 is still loose in the wire receiving chamber 53 and therefore not fully connected and fixated. The extension opening 69 allows the binding screw 1 to be screwed deeper into the wire receiving chamber 53. Therefore, more wire strands will be displaced by the penetration portion 19 and the displacement areas 67 will be filled with strands. Therefore, an electrical contact between the binding screw 1 and the stranded wire 51 and also fixation of the stranded wire 51 in the connector body 49' is achieved.

The contact section 17 of the binding screw 1 is disposed in the wire receiving chamber 53 in FIG. 6. The inner diameter 59 of the wire receiving chamber 53 is larger than a diameter of the stranded wire 51 inserted into the wire receiving chamber 53. If, for example, the inner diameter 59 is 5 to 10% larger than a diameter of a stranded wire 51, the stranded wire 51 can easily be inserted into the wire receiving chamber 53.

The size of the penetration portion 19 is chosen such that the tip 33 reaches the inner wall 63 of the wire receiving chamber 53. As shown in FIG. 6, the contact section 17 is fully inserted in the wire receiving chamber 53 in a way that rear ends 71 of the contact section 17 are aligned with the inner wall 63 of the wire receiving chamber 53. The length 21 of the penetration portion 19 and the diameter 23 of the binding screw are chosen in such a way that displacement areas 67 are formed, which are bordered by the surface 73 of the penetration portion 19 and the inner wall 63 of the wire receiving chamber 53. These displacement areas 67 have in sum an area which is equal to the cross section of the cable. Further, in order to improve the electrical contact between the contact section 17 and the stranded wire 51, a reducing agent 24 which reduces oxide layers on the strands may be disposed on a surface of the contact section 17 as shown in FIG. 6. This results in an optimal electrical contact between the binding screw 1, the stranded wire 51, and the connector body 49'.

Advantageously, the binding screw 1 according to the invention has the contact section 17 penetrating into the stranded wire 51 during insertion of the binding screw 1 into the connector body 49. Instead of pressing the strands along an insertion direction I, the binding screw 1 penetrates the stranded wire 51 so that the strands are displaced by the penetration portion 19 mostly perpendicular to the insertion direction I; therefore, the risk of damaging the strands is reduced. Further, since the length of the penetration portion 19 is at least three-quarters of the diameter 23 of the binding screw 1 in the threaded section 9, the binding screw 1 provides a contact section 17 with a large contact area between the binding screw 1 and the stranded wire 51. The displacement of the wire 51 leads to a movement of most of the single strands and therefore to friction between neighboring strands; an aluminum oxide layer on the strands can be removed or at least weakened by this movement.

What is claimed is:

1. A wire connection assembly, comprising:
    a connector body having a wire receiving chamber and an internally threaded bore open into the wire receiving chamber; and
    a binding screw capable of being screwed into the bore into an inserted position, the binding screw including a driving section, a threaded section, and a contact section having a tapered penetration portion establishing electrical contact with a stranded wire, the binding screw and the stranded wire filling an entirety of the wire receiving chamber in the inserted position, a length of the tapered penetration portion being at least three-quarters of a diameter of the binding screw in the threaded section.

2. The wire connection assembly of claim 1, wherein the stranded wire is a stranded aluminum wire.

3. The wire connection assembly of claim 1, wherein the length of the tapered penetration portion is at least two-thirds of an inner diameter of the wire receiving chamber.

4. The wire connection assembly of claim 1, wherein a reducing agent is disposed on a surface of the contact section.

5. The wire connection assembly of claim 1, wherein at least three-quarters of an outer surface of the tapered penetration portion abuts the stranded wire.

6. The wire connection assembly of claim 3, wherein, in an inserted position of the binding screw, the binding screw extends into the wire receiving chamber over at least three-quarters of the inner diameter of the wire receiving chamber.

7. The wire connection assembly of claim 6, wherein an inner wall of the wire receiving chamber opposite the bore has an extension opening.

8. The wire connection assembly of claim 7, wherein the extension opening receives the tapered penetration portion.

9. The wire connection assembly of claim 8, wherein the extension opening is a blind hole.

10. The wire connection assembly of claim 3, wherein the inner diameter of the wire receiving chamber is larger than a diameter of the bore.

11. A binding screw for a wire connection assembly, comprising:
    a driving section;
    a threaded section;
    a contact section having a tapered penetration portion establishing electrical contact with a stranded wire, the driving section, the threaded section, and the contact section extending along a central axis of the binding screw, a length of the tapered penetration portion being at least three-quarters of a diameter of the binding screw in the threaded section, the tapered penetration portion having a first conical section with an angle between a surface of the first conical section and the central axis being less than 30° and a second conical section disposed between the first conical section and the threaded section; and
    a shear element disposed between the driving section and the threaded section, the shear element having a third conical section with a lower diameter end facing the threaded section and a cylindrical section disposed between the third conical section and the threaded section.

12. The binding screw of claim 11, wherein the stranded wire is a stranded aluminum wire.

13. The binding screw of claim 11, wherein the length of the tapered penetration portion is at least equal to the diameter of the binding screw in the threaded section.

* * * * *